United States Patent
Heselhaus

(10) Patent No.: US 7,922,232 B2
(45) Date of Patent: Apr. 12, 2011

(54) MOVABLE MULTISECTION ROOF FOR A MOTOR VEHICLE

(75) Inventor: Udo Heselhaus, Ibbenbüren (DE)

(73) Assignee: Wilhelm Karmann GmbH, Osanbrück (DE)

( * ) Notice: Subject to any disclaimer, the term of this patent is extended or adjusted under 35 U.S.C. 154(b) by 0 days.

(21) Appl. No.: 10/531,682

(22) PCT Filed: Oct. 10, 2003

(86) PCT No.: PCT/DE03/03367
§ 371 (c)(1),
(2), (4) Date: Apr. 15, 2005

(87) PCT Pub. No.: WO2004/037583
PCT Pub. Date: May 6, 2004

(65) Prior Publication Data
US 2005/0280280 A1 Dec. 22, 2005

(30) Foreign Application Priority Data
Oct. 17, 2002 (DE) .................................. 102 48 344

(51) Int. Cl.
*B60J 7/08* (2006.01)
*B60J 7/12* (2006.01)
(52) U.S. Cl. .............................. 296/107.15; 296/107.08
(58) Field of Classification Search .................. 296/76, 296/107.08, 136.05, 107.09, 107.15
See application file for complete search history.

(56) References Cited

U.S. PATENT DOCUMENTS

| | | | | |
|---|---|---|---|---|
| 4,644,235 A | * | 2/1987 | Ohta | 318/282 |
| 5,042,868 A | * | 8/1991 | Nothaft et al. | 296/107.09 |
| 5,558,388 A | * | 9/1996 | Furst et al. | 296/107.2 |
| 5,582,454 A | * | 12/1996 | Grover | 296/107.09 |
| 6,095,589 A | * | 8/2000 | Kinnanen et al. | 296/107.09 |
| 6,250,707 B1 | * | 6/2001 | Dintner et al. | 296/76 |
| 6,267,433 B1 | * | 7/2001 | Bayer et al. | 296/121 |
| 6,270,144 B1 | * | 8/2001 | Schenk | 296/107.08 |
| 6,299,233 B1 | * | 10/2001 | Mentink | 296/107.09 |

(Continued)

FOREIGN PATENT DOCUMENTS
DE 39 25 150 2/1990
(Continued)

OTHER PUBLICATIONS
Computer translation for DE 19926474.*

*Primary Examiner* — Glenn Dayoan
*Assistant Examiner* — Melissa A Black
(74) *Attorney, Agent, or Firm* — Lucas & Mercanti, LLP; Klaus P. Stoffel

(57) ABSTRACT

The invention relates to a motor vehicle (1) provided with a roof (2) comprising at least one part (3) which is fully movable for the opening thereof and extends from an area adjacent to a windscreen frame (4) to the rear particularly rigid part (5) of the roof. The inventive motor vehicle is characterized in that the movable part (3) of the roof, which is otherwise in a closed position, can be raised in the back area thereof.

11 Claims, 17 Drawing Sheets

U.S. PATENT DOCUMENTS

| | | | |
|---|---|---|---|
| 6,305,735 B1 * | 10/2001 | Neubrand | 296/116 |
| 6,742,829 B2 * | 6/2004 | Reihl | 296/108 |
| 6,802,554 B1 * | 10/2004 | Just et al. | 296/107.09 |
| 2001/0017478 A1 | 8/2001 | Reinsch | |
| 2002/0125732 A1 * | 9/2002 | Dietl | 296/107.09 |
| 2003/0038501 A1 * | 2/2003 | Heselhaus | 296/107.09 |
| 2003/0047961 A1 * | 3/2003 | Nania | 296/107.08 |
| 2005/0088008 A1 * | 4/2005 | Quindt et al. | 296/107.08 |

FOREIGN PATENT DOCUMENTS

| | | |
|---|---|---|
| DE | 42 03 229 | 8/1993 |
| DE | 197 31 330 | 2/1999 |
| DE | 19731330 A1 * | 2/1999 |
| DE | 197 41 264 | 3/1999 |
| DE | 199 26 474 | 12/2000 |
| DE | 19926474 A1 * | 12/2000 |

\* cited by examiner

MOVABLE MULTISECTION ROOF FOR A MOTOR VEHICLE

BACKGROUND OF THE INVENTION

1. Field of the Invention

The invention concerns a motor vehicle with a roof, which has at least one part that can be fully moved to allow the roof to be opened.

2. Description of the Related Art

DE 199 26 474 A1 describes a convertible that allows two roof positions, namely, a completely closed position and a completely open position, especially in a high construction vehicle. To this end, the roof is divided transversely into several roof sections arranged one behind the other. However, besides the two specified roof positions, no others are possible. In addition, the conversion of the roof from its closed position to its open position and vice versa must be carried out with the vehicle stopped or nearly stopped, because a rear roof part makes an acute angle with the direction of travel as it is opened and therefore presents a large surface of attack to the airflow over the vehicle.

SUMMARY OF THE INVENTION

The invention is based on the problem of creating a motor vehicle that has a high degree of flexibility with respect to the opening of the roof parts.

The invention solves this problem with a motor vehicle that has a roof with at least one movable roof part that can be fully opened and extends from an area adjacent to a windshield frame to a rear roof part, wherein a raisable rear section of the movable roof part is raisable in such a way that a section of the movable roof part located in front of the raisable rear section remains in a closed position.

The invention makes it possible to raise only one rear section of a roof part that can also be fully opened, and this makes it possible to realize a large number of opening states of this roof part. As a result of the fact that when the rear section of this roof part is raised, the roof part remains otherwise closed, an especially low-draft ventilation position can be realized. The total opening movement does not have to be initiated to allow the partial opening in the rear section, so that the mechanism for the partial opening can be kept simple. Another advantage is that the airflow attack surface is minimized, so that the movement into the raised position and the return movement are also possible while the vehicle is moving, even at high speeds.

If the movable roof part occupies the whole width between the side windows, then a convertible vehicle or targa-top vehicle can be formed with the roof part completely opened. Even if only the rear section is raised, then a ventilation opening that covers the entire interior width is created. The open-air feeling is greatly enhanced compared to vehicles with solid roof frame parts, in which only a sliding or tilt sunroof has been installed in the central area of the roof.

Whether the rear roof part can also be lowered into the automobile body to create a convertible, or only a partial opening of the roof is to remain possible is independent of the roof part design of the invention. Therefore, this design can be used for a wide variety of roofs and thus allows maximum flexibility.

It is advantageous that it is also possible for the rear roof part of a vehicle also to be optionally lowered, depending on the loading situation, or, if, for example, more storage space is needed, to remain in the targa position.

If the movable roof part is covered by a flexible, especially textile, covering, it is advantageous to provide a roof bow to allow the rear section of the movable roof part to be raised. This roof bow can be displaced relative to lateral frame parts on which it is mounted but can be moved with the lateral frame parts to allow complete opening of the roof. The additional mechanical expense to mount the roof bow displaceably on the frame parts is small and does not require much construction space. In the closed position, the roof bow can ensure that the moving roof part presses against and seals the rear roof part.

BRIEF DESCRIPTION OF THE DRAWING

Other advantages and features of the invention are apparent from the specific embodiment of the object of the invention that is illustrated in the drawings and described below.

DETAILED DESCRIPTION OF THE INVENTION

Figure 1:
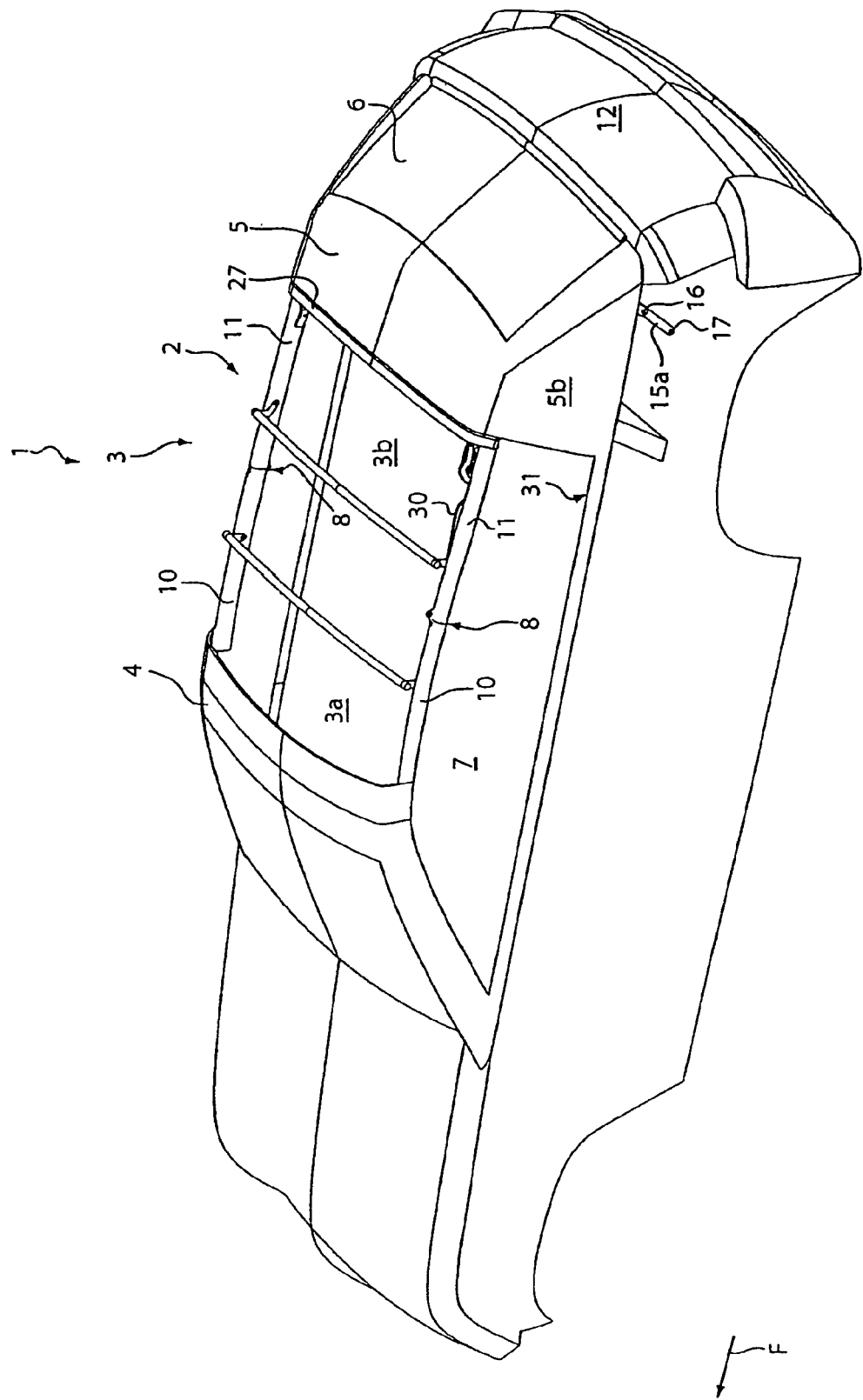
FIG. 1 shows a schematic, perspective overall view of a motor vehicle of the invention with the roof closed but without the textile roof covering.

The vehicle 1 of the invention that is shown in FIG. 1 has a roof 2 that has at least one front section 3 that can be opened. This front section 3 extends in the longitudinal direction of the vehicle from a windshield frame 4 to a rear roof part 5, which encloses a rear window 6. The front, movable section 3 is not necessarily directly connected, as shown here, with the windshield frame 4.

The movable roof part 3 is essentially horizontal when the roof 2 is closed. In the illustrated embodiment, it extends over the entire width of the interior of the vehicle, and in the closed state of the roof, it is in contact with the upper edges of the side windows 7. Since the roof covers an interior with at least two rows of seats arranged one behind the other, the movable roof part 3 has a transverse division 8 to allow the sections 3*a*, 3*b*, which are arranged one behind the other, to be folded towards each other. The sections 3*a*, 3*b* can be formed both by rigid panels and by frame constructions that are covered by a flexible covering 9. In the latter case, lateral frame parts 10 and 11 are assigned to the sections 3*a* and 3*b*, respectively.

In a shorter vehicle 1, say, in a two-seater, the movable roof part 3 can also get by without a transverse division 8.

The rear roof part 5 that encloses the rear window 6 can also be either completely rigid, as shown in the present embodiment, or flexible, at least in certain regions. The rear window 6 can be moved into the tailgate 12 below it, as shown, for example, in FIG. 2.

The roof parts 3 and 5 can be moved independently of each other and are completely separated from each other. The roof part 3 is movably connected with the automobile body by lateral linkages 13, each of which is designed as a four-bar linkage. In this regard, each side of the vehicle is provided with two linkages 14, 15, which are pivoted on bearings 16, 17 that are fixed with respect to the automobile body. Details of this are illustrated in FIGS. 11 to 16.

Figure 11:
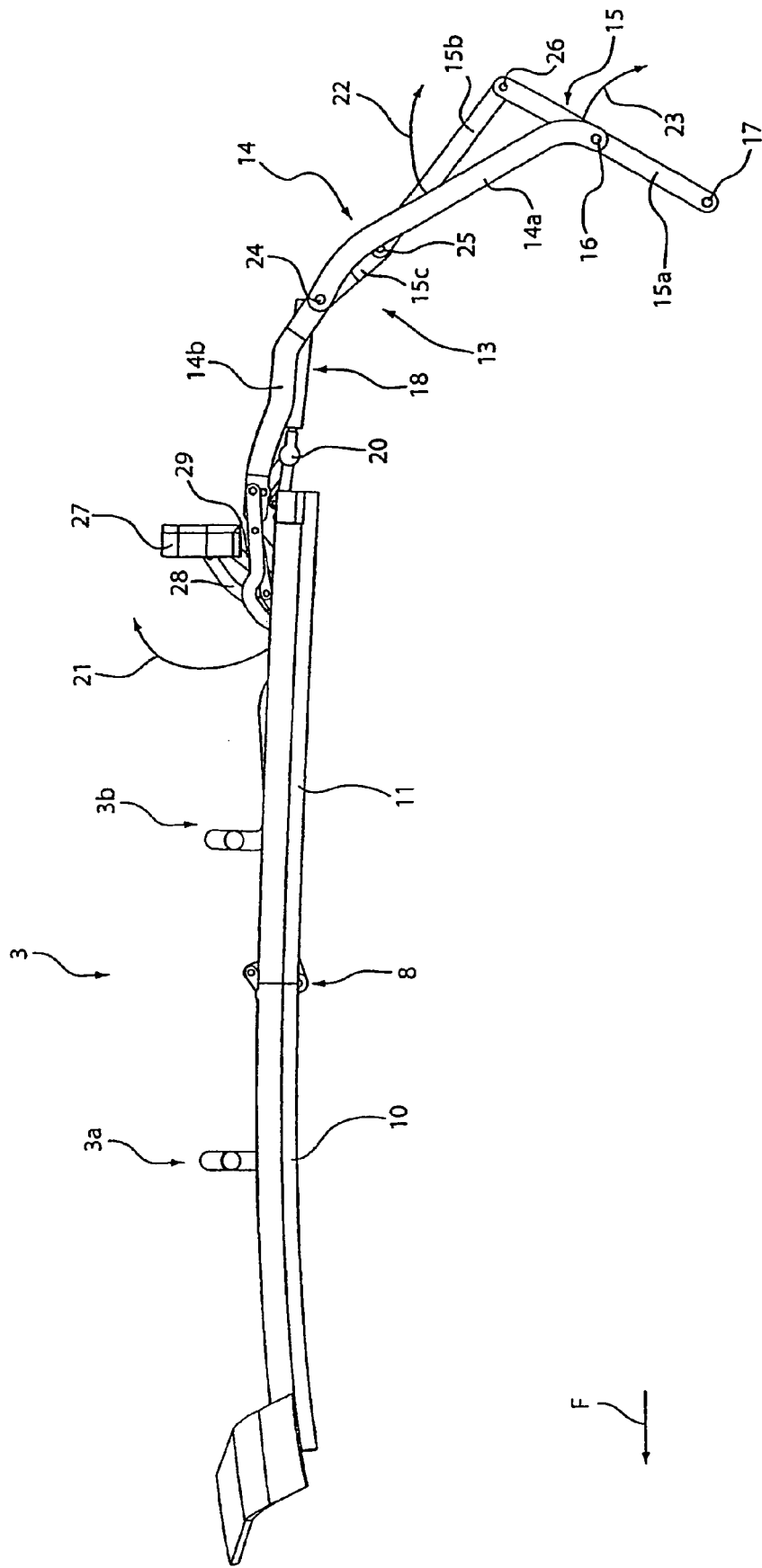
FIG. 11 shows the roof linkage in the roof position according to FIG. 2 in a schematic side view.
Figure 12:
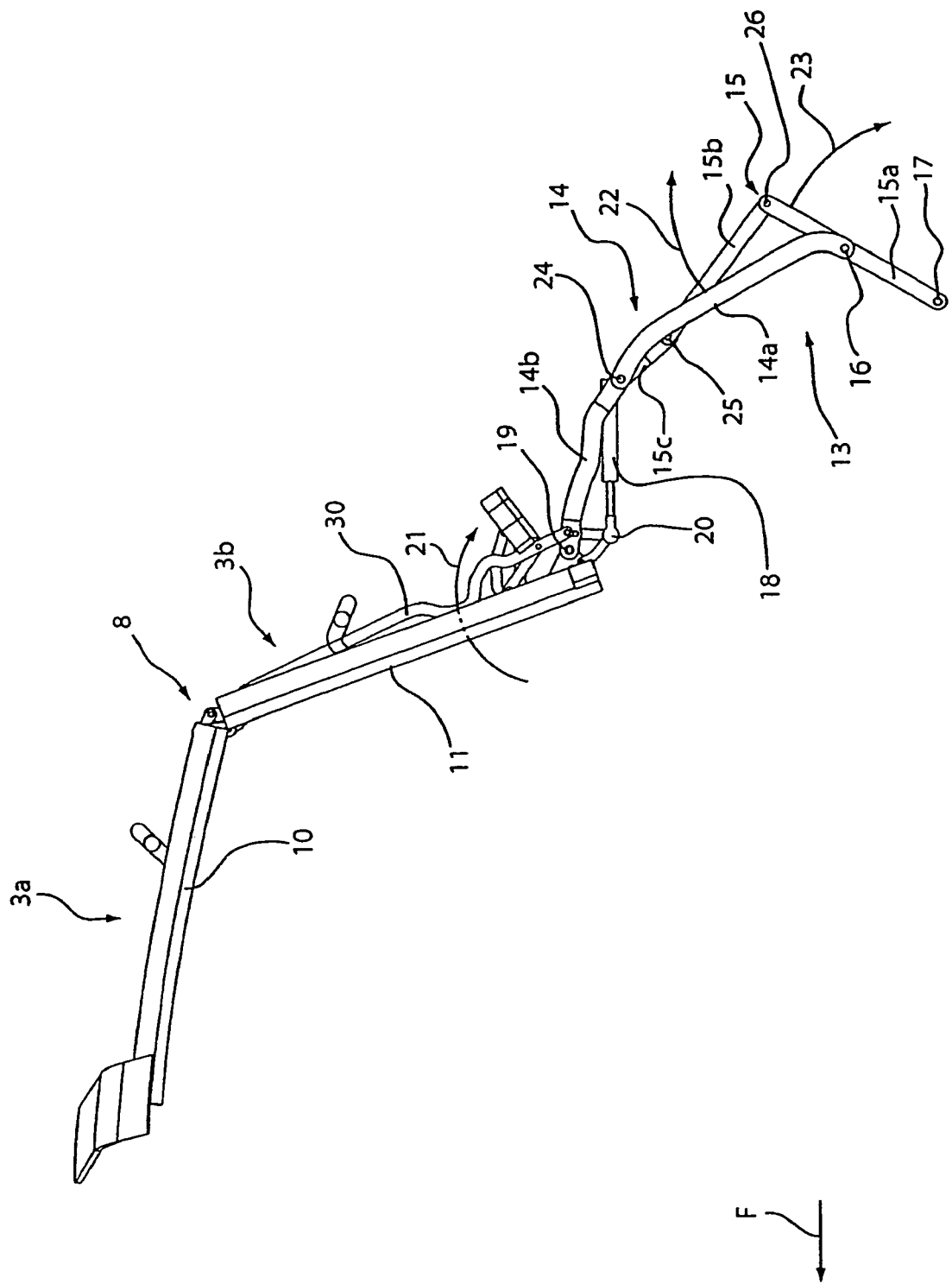
FIG. 12 shows the roof linkage in the roof position according to FIG. 4 in a schematic side view.
Figure 13:
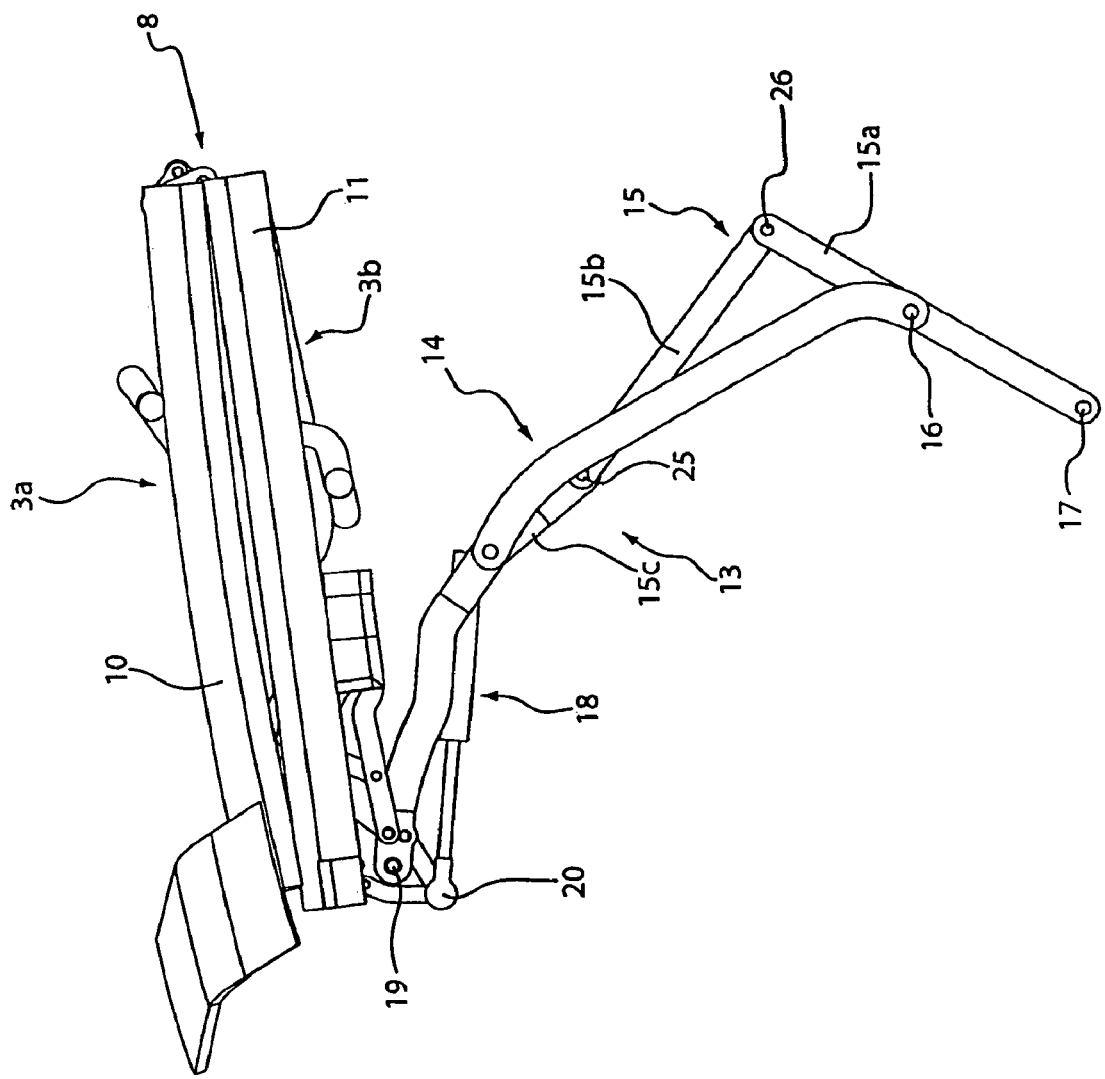
FIG. 13 shows the roof linkage in the roof position according to FIG. 5 in a schematic side view.

The linkage 15 acts on a joint 20 of the front roof part 3 by means of a drive element 18. The joint 20 is assigned to the rear end of the longitudinally extending frame part 11. The linkage 14, on the other hand, acts indirectly on the frame part 11 by means of a horizontal pivot axis 19 that is located at a vertically higher level. The height displacement of the points of force application 18 and 20 results in a lever arm, by which the frame part 11, when the drive element 18 is moved out, can be swiveled in the direction of arrow 21 about the axis 19, which remains motionless to effect the first lowered position of the roof. In this way, the front roof part 3 can be opened into a first lowered position above the rear roof part 5 (FIGS. 11 to 13). In the illustrated embodiment, this first lowered position is provided as an additional, but not essential, option for the lowering of the roof.

Figure 14:
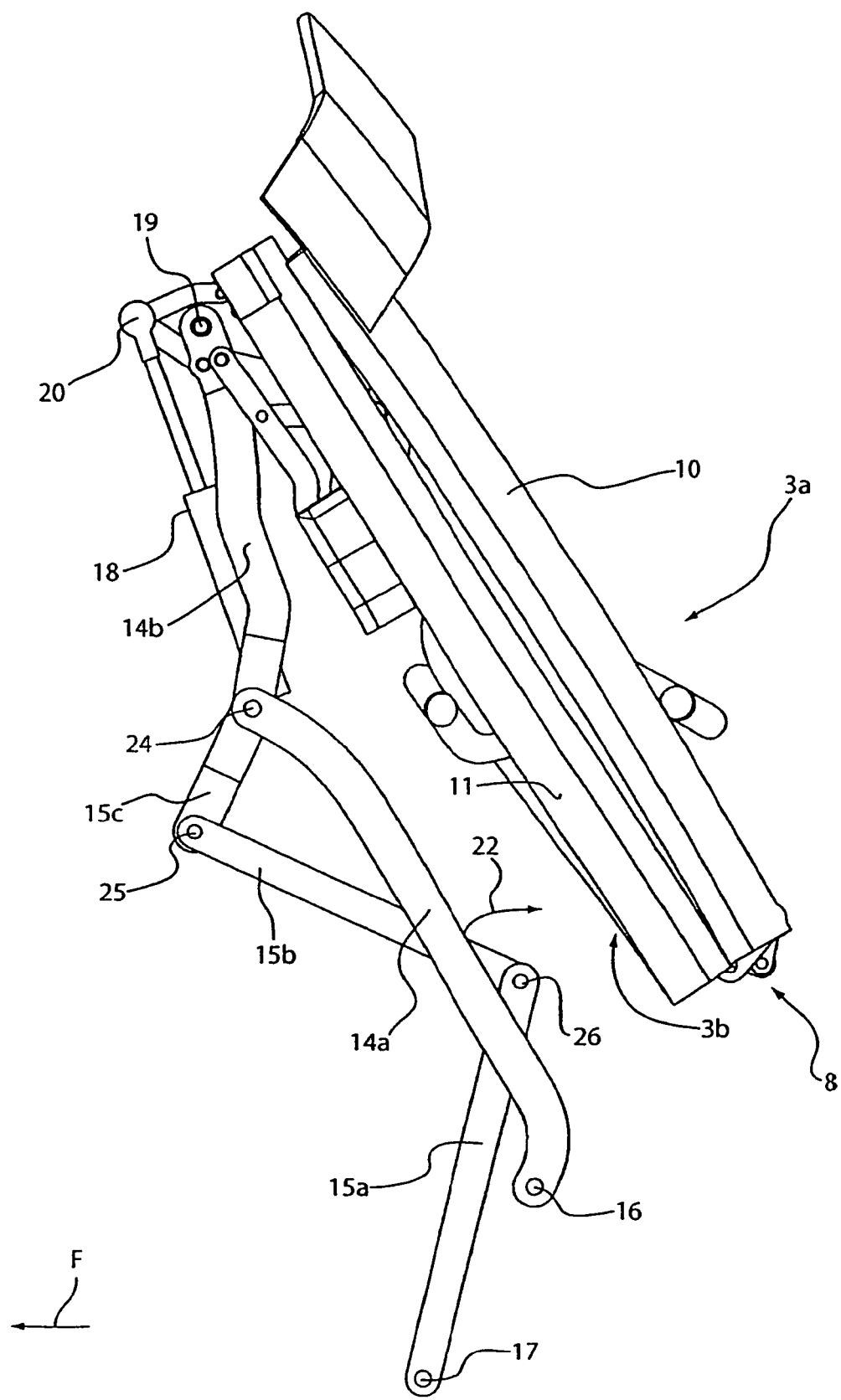
FIG. 14 shows the roof linkage in the roof position according to FIG. 6 in a schematic side view.
Figure 15:
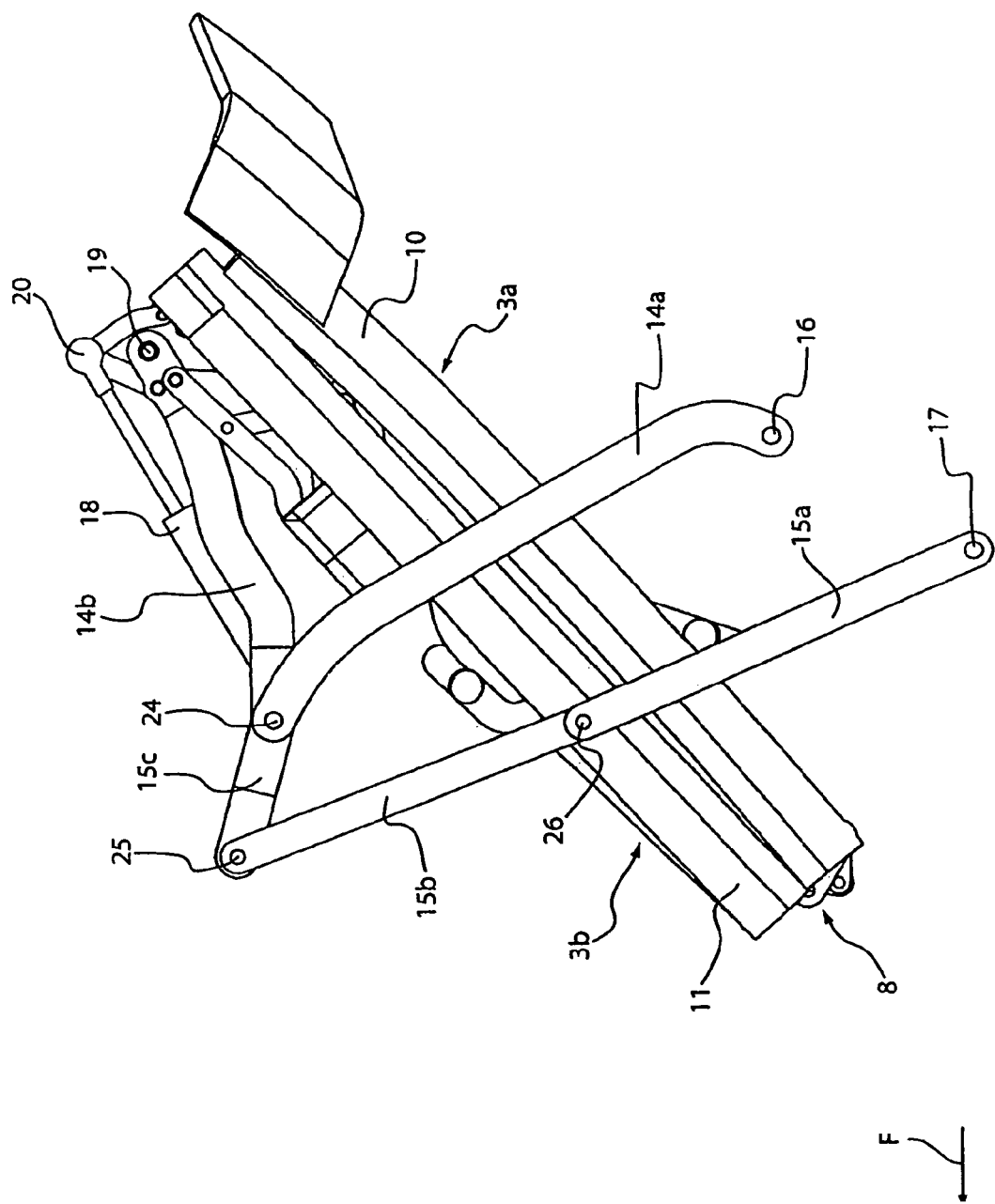
FIG. 15 shows the roof linkage in the roof position between FIGS. 6 and 7 in a schematic side view. between FIGS. 6 and 7 in a schematic side view.
Figure 16:
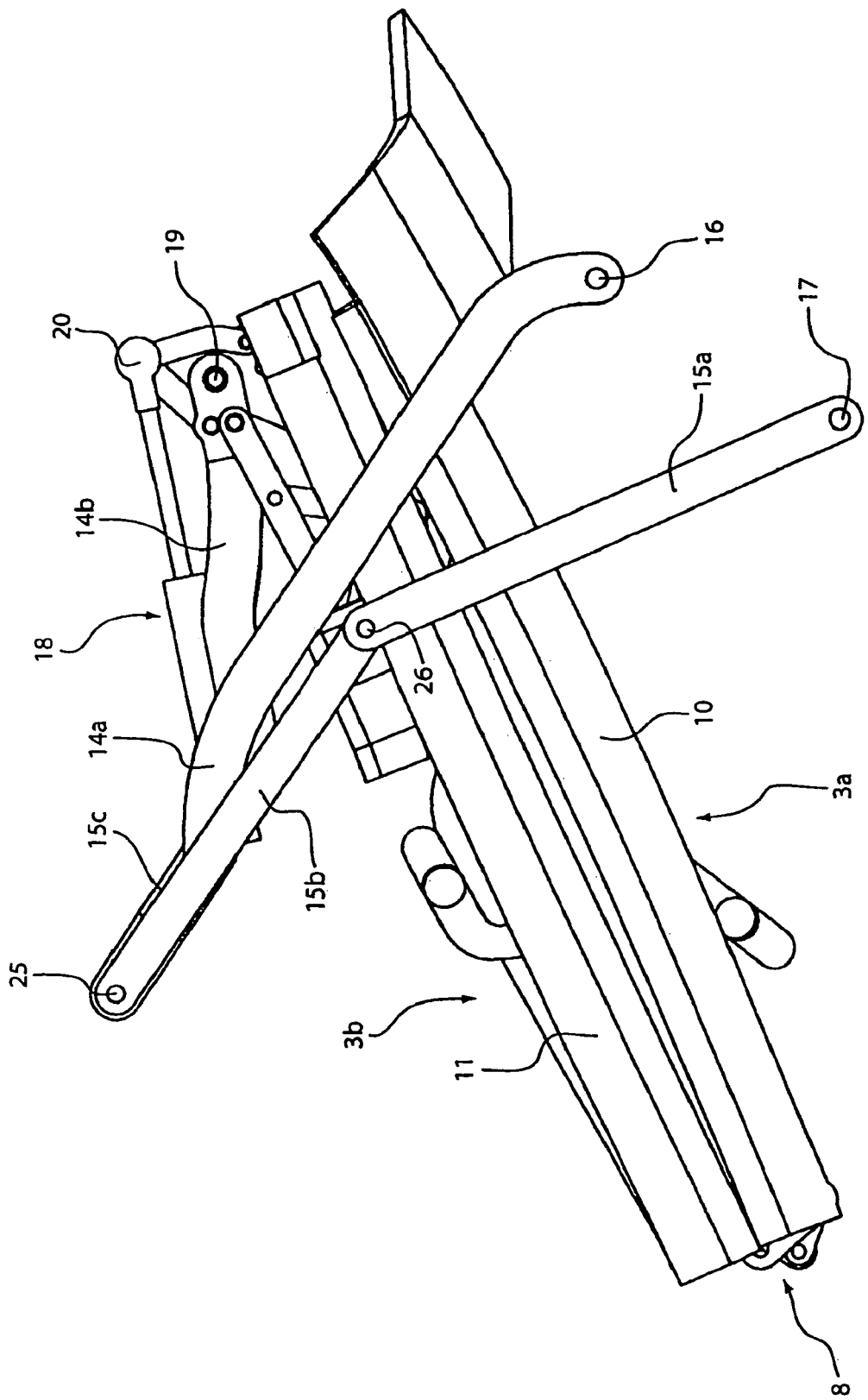
FIG. 16 shows the roof linkage in the roof position according to FIG. 7 in a schematic side view.

In addition, the linkages 14 and 15 can also be swiveled about the axes 16 and 17, which are fixed with respect to the automobile body, in the directions of arrows 22, 23 and in the opposite directions (FIGS. 14 to 16).

The linkage 14 is divided into sections 14*a* and 14*b* at at least one additional joint 24. Section 14*a* extends from the main bearing 16, which is fixed with respect to the automobile body, to the joint 24, and section 14*b* extends from there to the axis 19. The linkage 15 is divided at at least two joints 25, 26. Section 15*a* extends from the main bearing 17, which is fixed with respect to the automobile body, to the joint 26, section 15*b* extends from there to the other joint 25, and section 15*c* extends from there to the drive element 18. The pivoted attachment of section 15*c* to the drive element 18 is located on a common horizontal pivot axis with the joint 24 of the first linkage 14.

Figure 3:
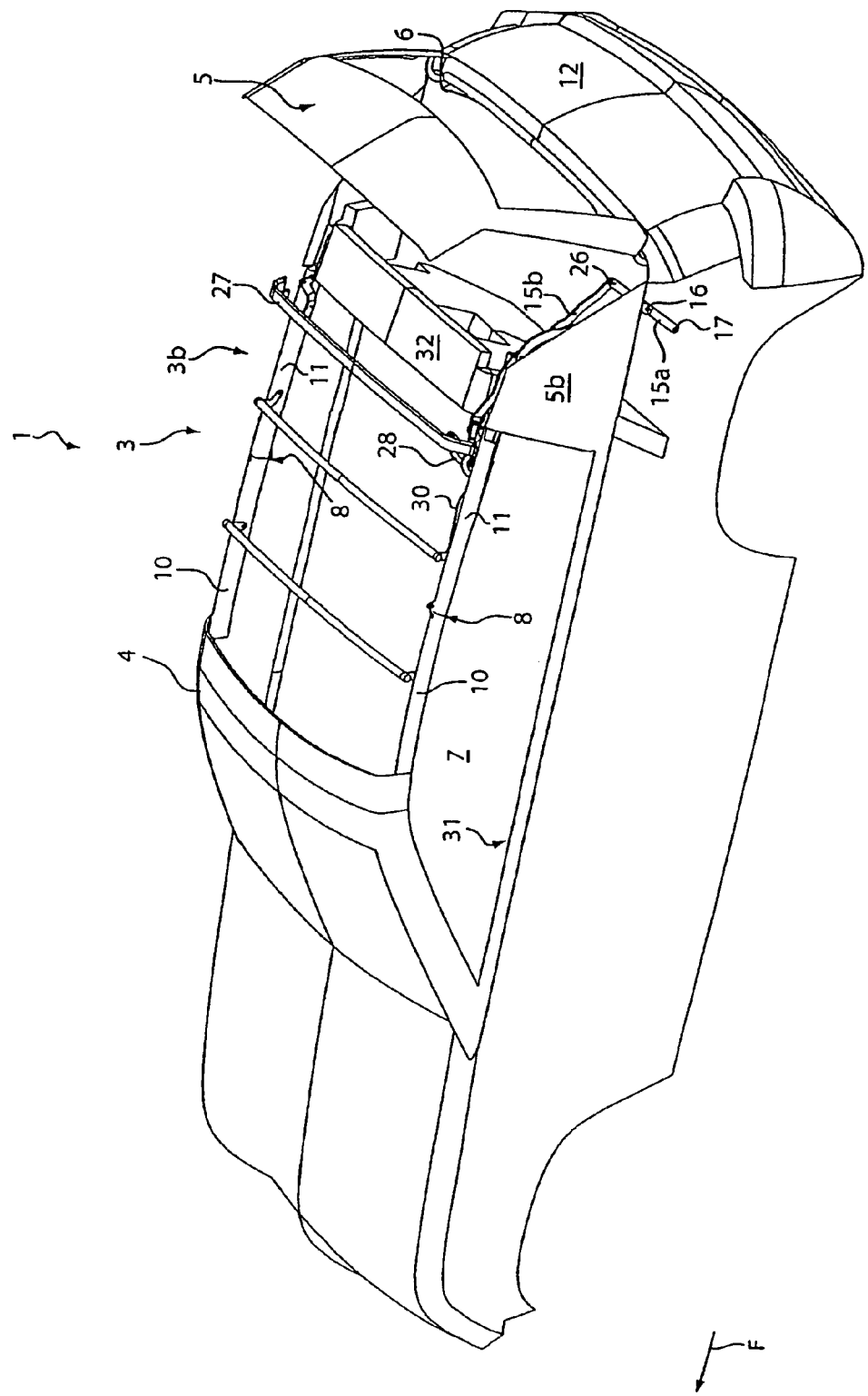
FIG. 3 shows a view similar to that of FIG. 2 with the rear roof part swung upward.
Figure 3A:
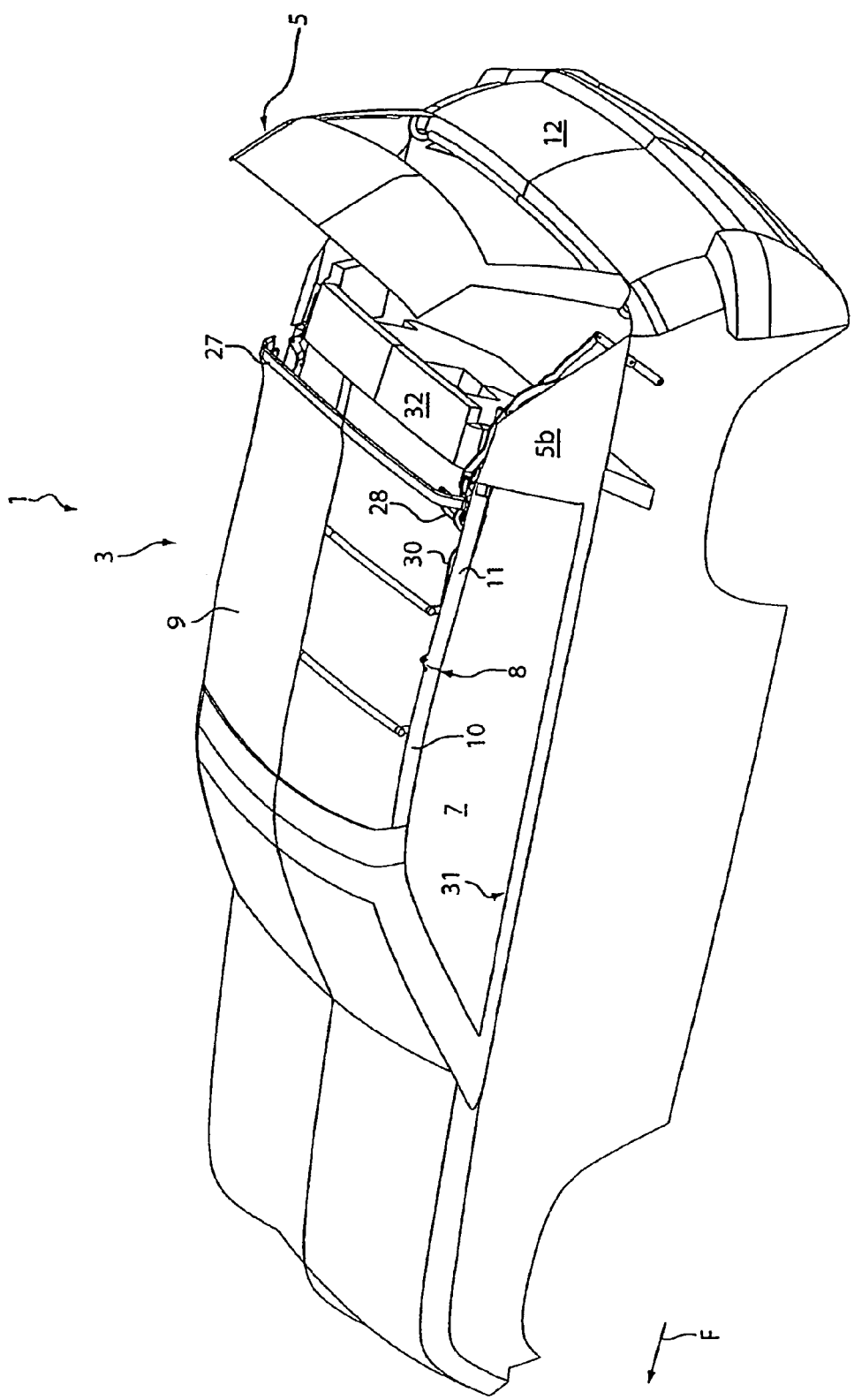
FIG. 3a shows the same state of movement of the roof as FIG. 3 but with the textile covering of the front roof part partially drawn.
Figure 4:
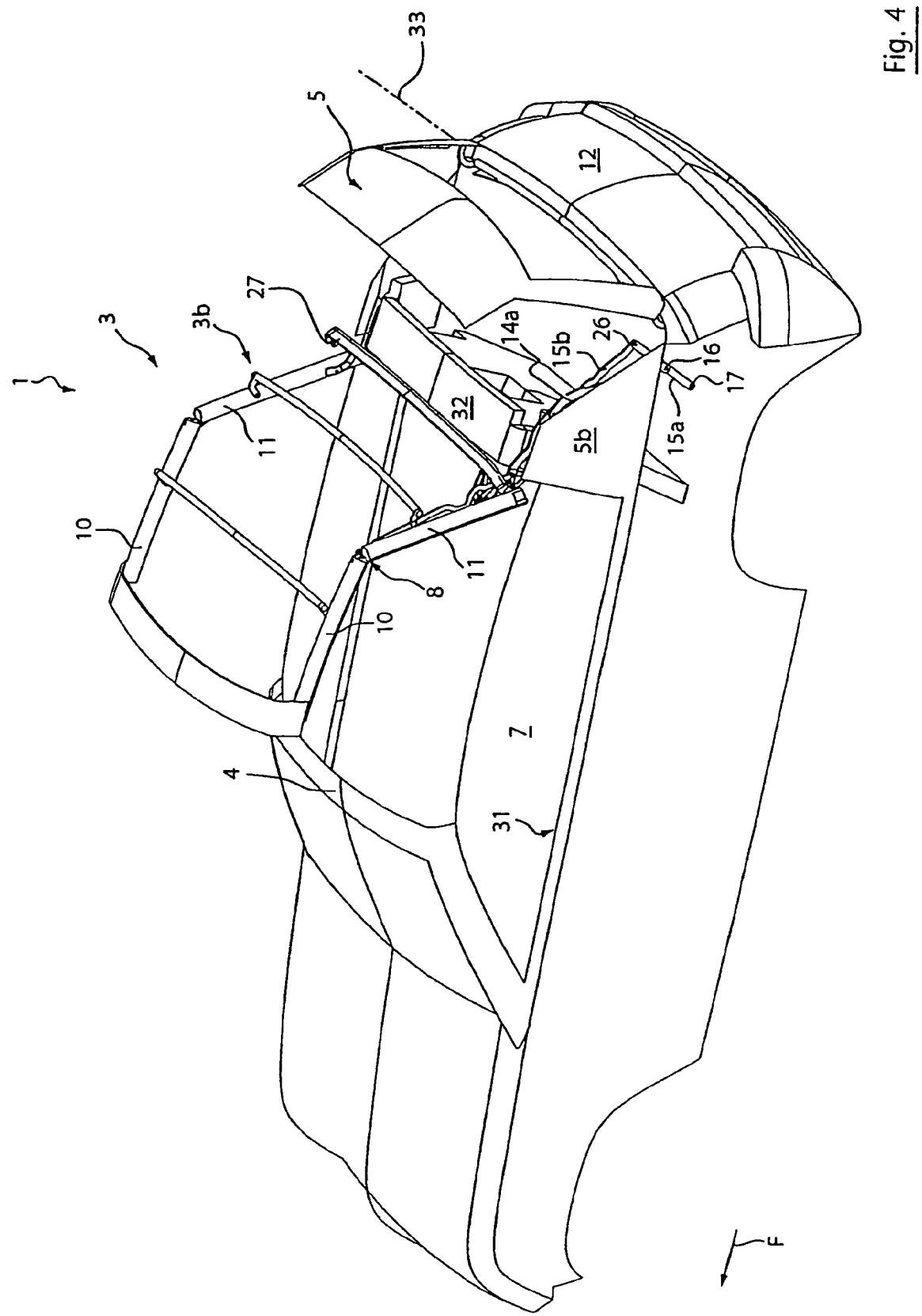
FIG. 4 shows a view similar to that of FIG. 3 with the opening of the roof progressing by the front roof part being swung up and folded.

A rear transverse roof bow 27, which can be moved relative to the lateral frame parts 10, 11 and is mounted on two levers 28, 29 that extend parallel to the frame part 11, is assigned to the roof section 3, which is covered with a textile material in the present embodiment. By raising these levers, the roof bow 27 can be displaced with unchanged orientation essentially parallel upward and forward with respect to the travel direction F. This results in the raising of the rear edge region of the roof part 3, so that a ventilation position is reached. This position can also be set during travel, since the movement of the levers 28, 29 does not require much force, and the textile covering 9 (FIG. 3*a*), which then rises only in the rear section, presents only a small surface of attack to the airflow over the vehicle. Therefore, the opening and closing of this ventilation opening can also be carried out at high speed. The movement of the roof bow 27 takes very little time. In its normal lowered position, the roof bow 27 clamps the covering 9 and seals its rear termination against the edge of the rear roof part 5 that is at the front relative to the direction of travel.

The actuation of the movement of the roof bow 27 can be remotely controlled from the dashboard and can be effected, for example, by electric or hydraulic drives.

Instead of the roof bow 27, other raising mechanisms can be provided, especially in the case of rigid roof parts, for a rear region of the moving roof part 3. In this regard, the use of a roof bow, which is present anyway, simplifies the manufacturing compared to expensive auxiliary mechanisms. The weight of the vehicle is also not significantly increased by the additional mobility of the rear roof section that is achieved in accordance with the invention.

Figure 2:
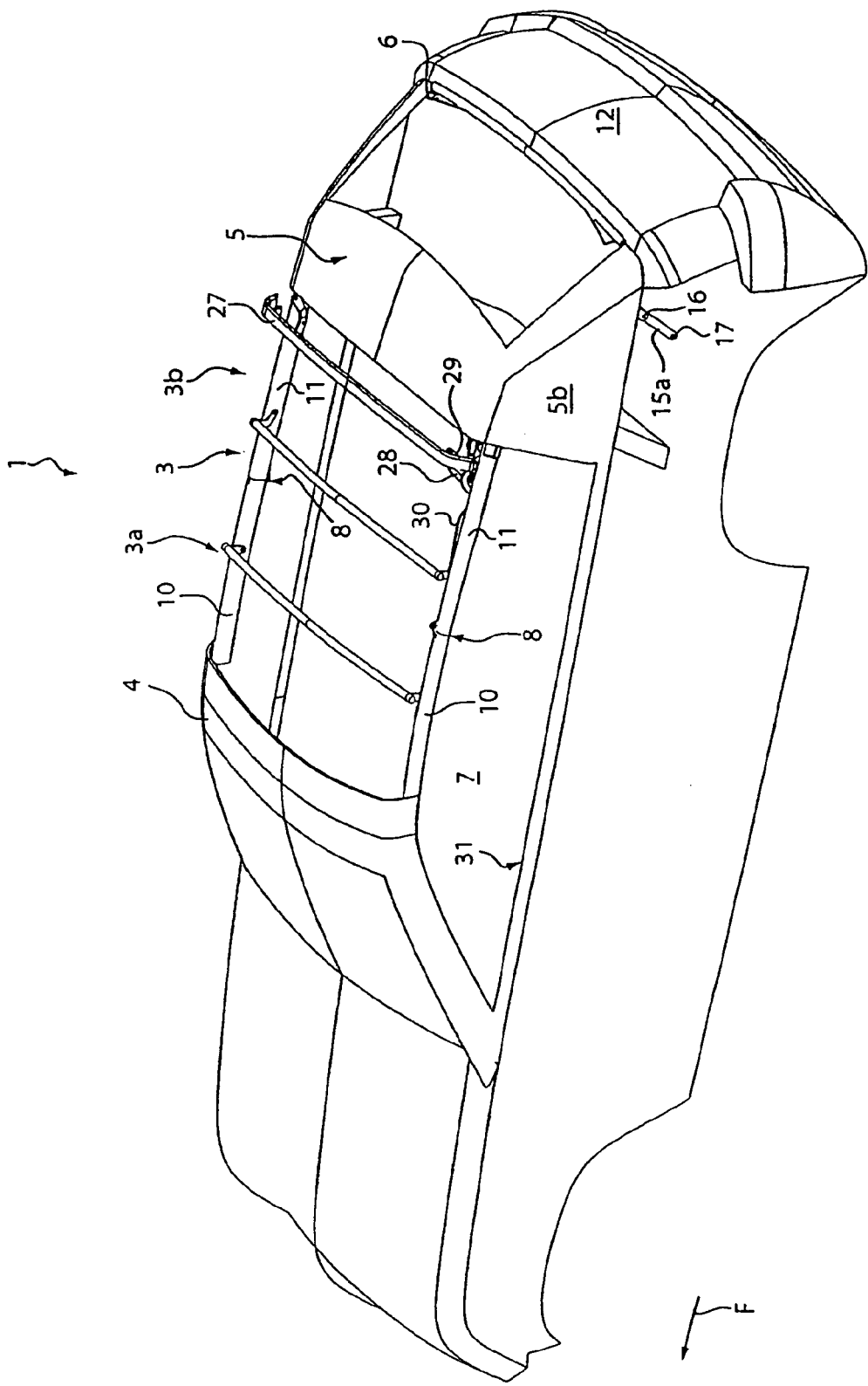
FIG. 2 shows a view similar to that of FIG. 1 with the rear end of the front roof part raised.
Figure 8:
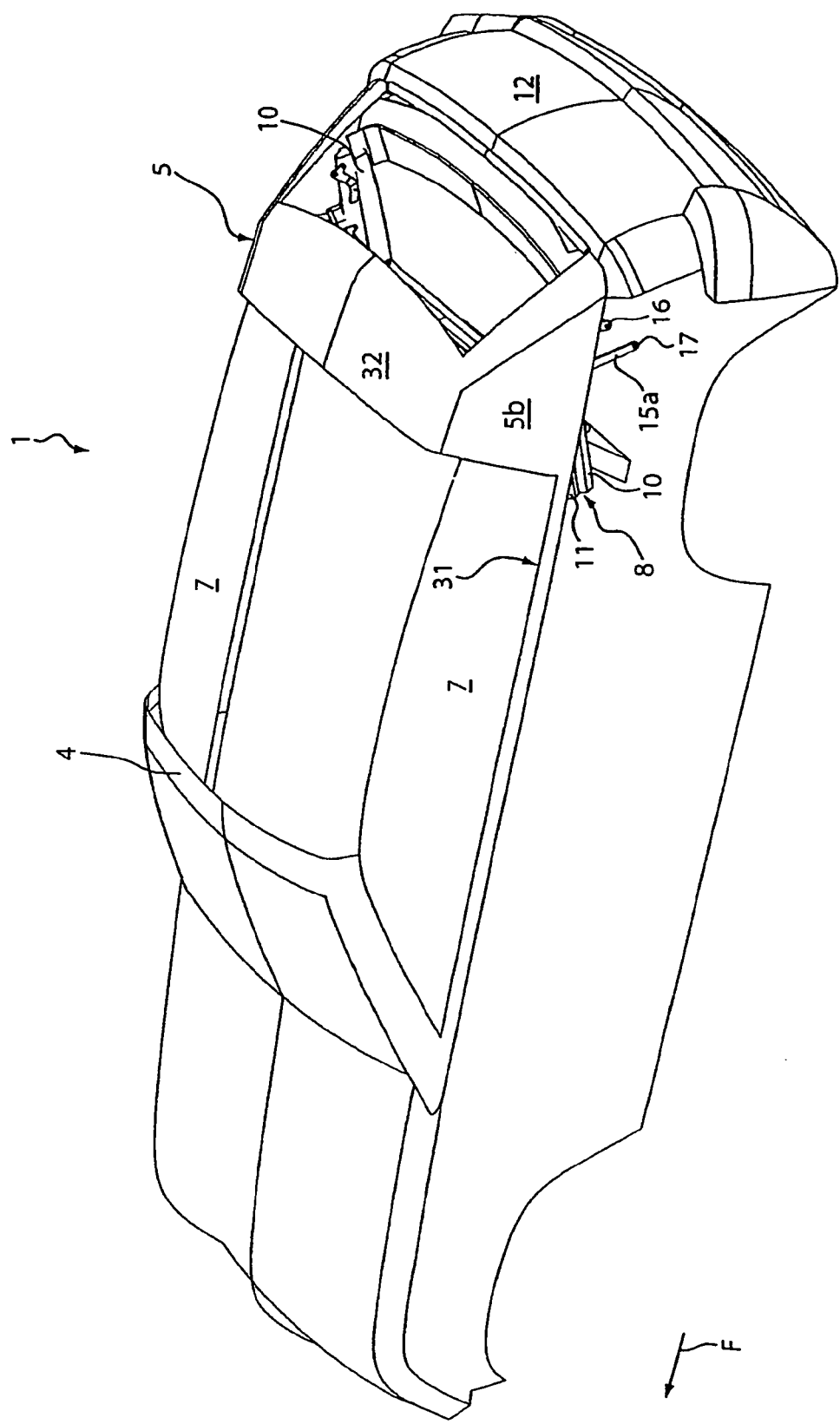
FIG. 8 shows a view similar to that of FIG. 7 with the position of the front roof part unchanged and the rear roof part swung back into its original position.
Figure 9:
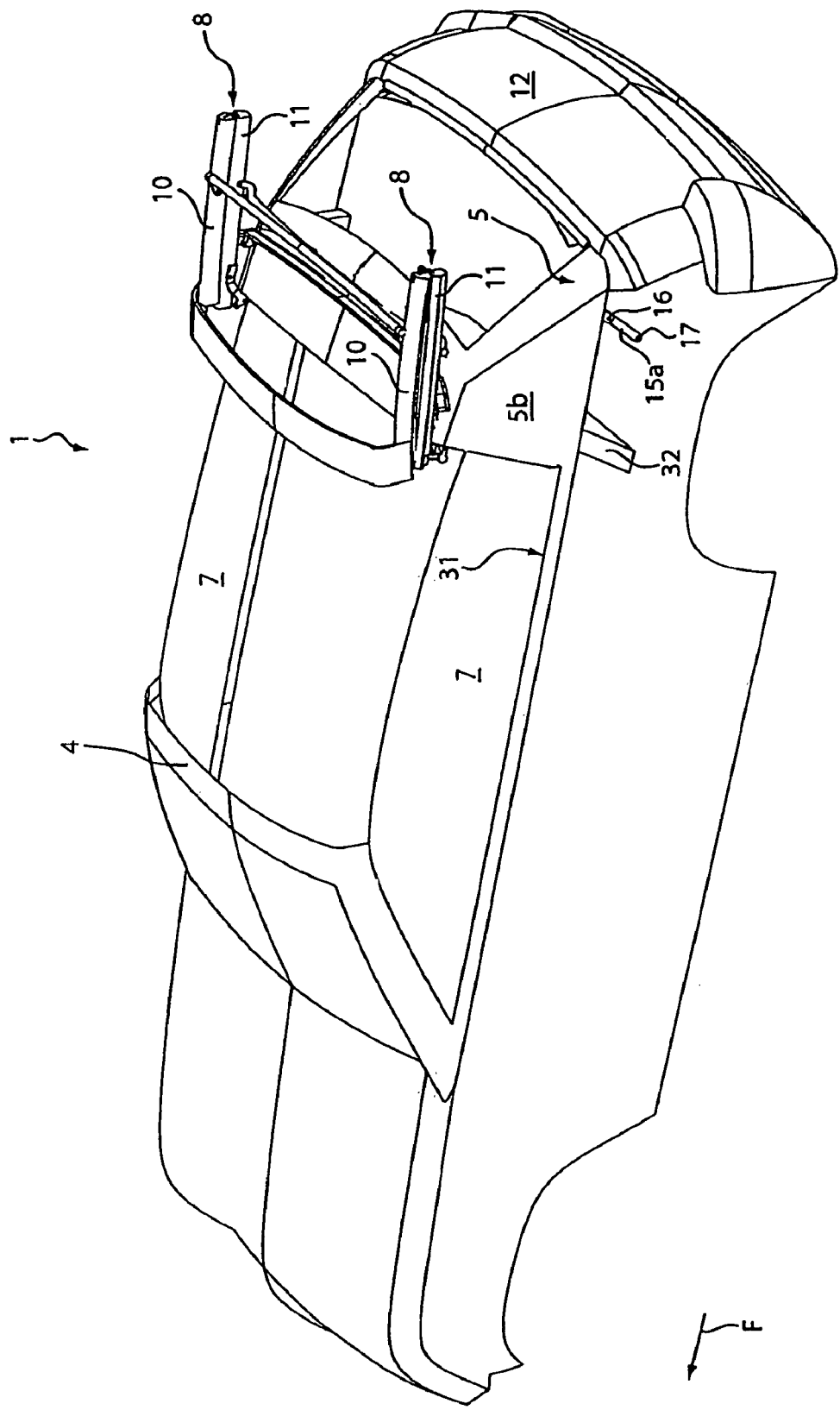
FIG. 9 shows an alternative lowered position of the front roof part above the rear roof part.
Figure 10:
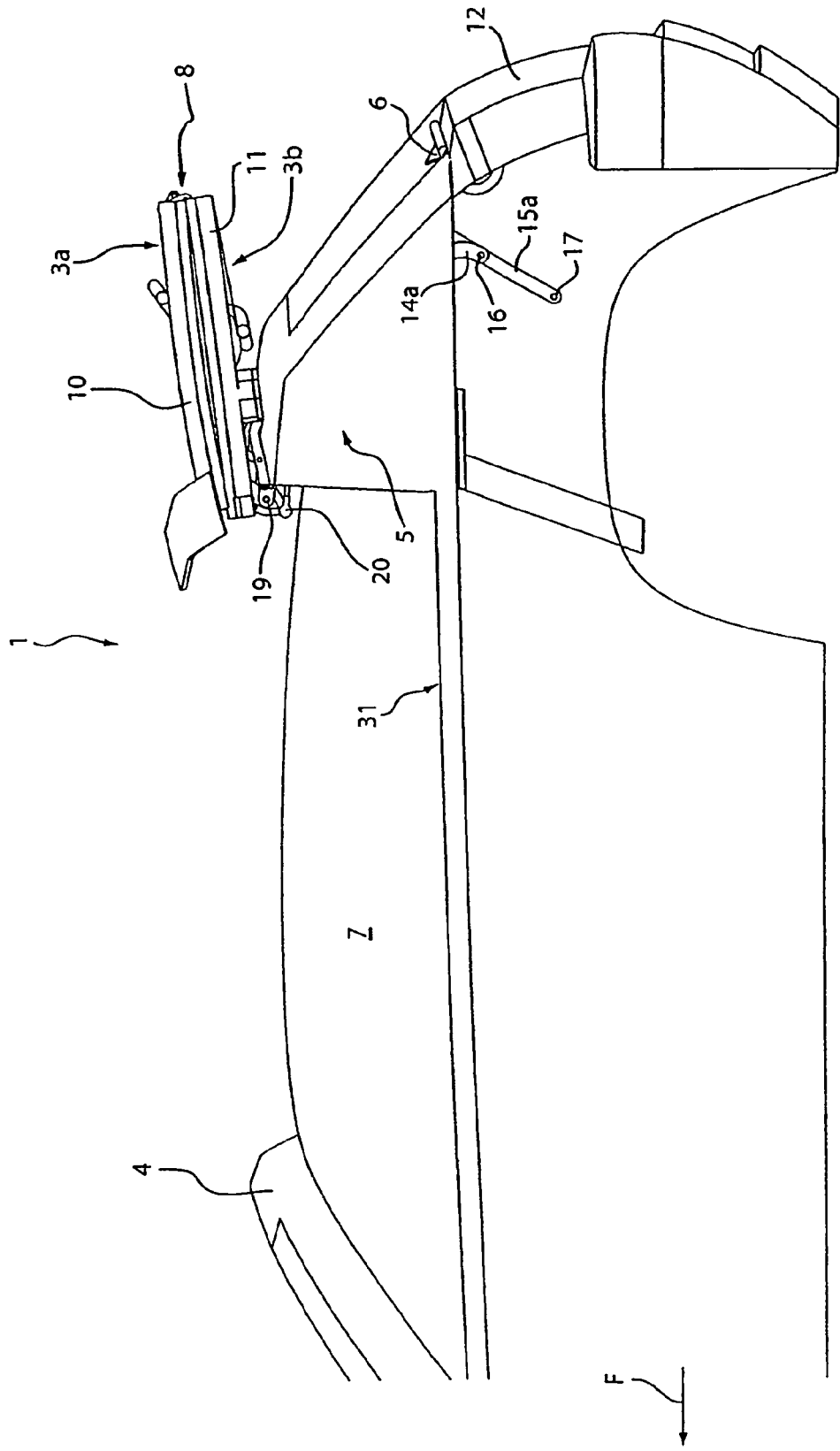
FIG. 10 shows the lowered position according to FIG. 9 but in a side view of the vehicle.

To convert the movable roof part 3 from the closed position shown in FIG. 1 to the aforementioned first open position shown in FIGS. 9, 10 and 13, in which it is held above the rear roof part 5, the roof bow 27—and thus the rear end of the movable roof part 3—is first raised (FIG. 2, FIG. 11). In this position, the roof part 3 can be moved relative to the rear roof part 5. The rear roof part 5 remains unmoved during this process, in contrast to the adjustment of the second lowered position according to FIGS. 3 to 8. As is clear from the transition from FIG. 11 to FIG. 12, first the drive element 18 is moved out to initiate the upward swiveling movement of the roof part 3 about the axis 19 in the direction of arrow 21. At the same time, a linkage part 30 forces the parts 3*a* and 3*b* to fold about the separating line 8. In the illustrated embodiment, the frame sections 10, 11 are each hinged together by hinges near the edges.

In this process, the linkages 14, 15 are not swiveled about their bearings 16, 17, which are fixed with respect to the automobile body. The bearing 24 thus maintains its position, as does the pivot axis 19.

When the drive element 18 is moved out further, the roof part 3*b* swivels farther in the direction of arrow 21 until an flip-over position has been reached. At the same time, parts 3*a* and 3*b* are folded together until they lie almost parallel one above the other (FIGS. 9, 10, 13).

Since the axis 19 maintains its position, the roof parts 3*a*, 3*b* also do not change their vertical position in the direction of a lowering to the belt line 31 but rather are lowered in the elevated position above the rear roof part 5. As FIG. 10 shows, the stack of the front roof part 3 formed in this way is sufficiently short in the longitudinal direction of the vehicle that it does not extend beyond the rear roof part or thus beyond the rear end of the vehicle.

Furthermore, the folded stack, in which the frame parts 10 and 11 lie one on top of the other, is very flat, so that the air resistance of the vehicle is only slightly increased by this lowered position of the roof. As a result of the fact that only a part 3 of the roof 2 is moved and that it is moved only in one plane, the movement is accomplished much faster than a full opening or a lowering of the roof part 3 below the belt line 31. The trunk is unaffected by this, as is visibility to the rear. Nevertheless, with the side windows down, a spacious open-air feeling is obtained.

On the other hand, to convert the movable roof part 3 from the closed position shown in FIG. 1 to a second open position, which is likewise shown here as a lowering possibility in FIGS. 8 and 16, in which it is held below the rear roof part 5, once again the roof bow 27—and thus the rear end of the movable roof part 3—is first raised (FIG. 2, FIG. 11). In this position, the roof part 3 can be moved relative to the rear roof part 5. The rear roof part 3 is then swiveled to the rear, either completely or with the lateral parts 5b kept in place, about a rear horizontal axis 33 in such a way that a space for the passage of the front roof part 3 is created above a stationary roll bar 32 located there. As a result of the fact that the rear window 6 was first moved down into the tailgate 12, the swiveling movement can take place without obstruction by the window 6. The movement of the roof part 3 is then carried out as described above by first moving out the drive element 18 (transition from FIG. 11 to FIG. 12) to initiate the upward swiveling movement of the roof part 3 about the axis 19 in the direction of arrow 21 and to cause the parts 3a and 3b to fold about the separating line 8.

Figure 5:
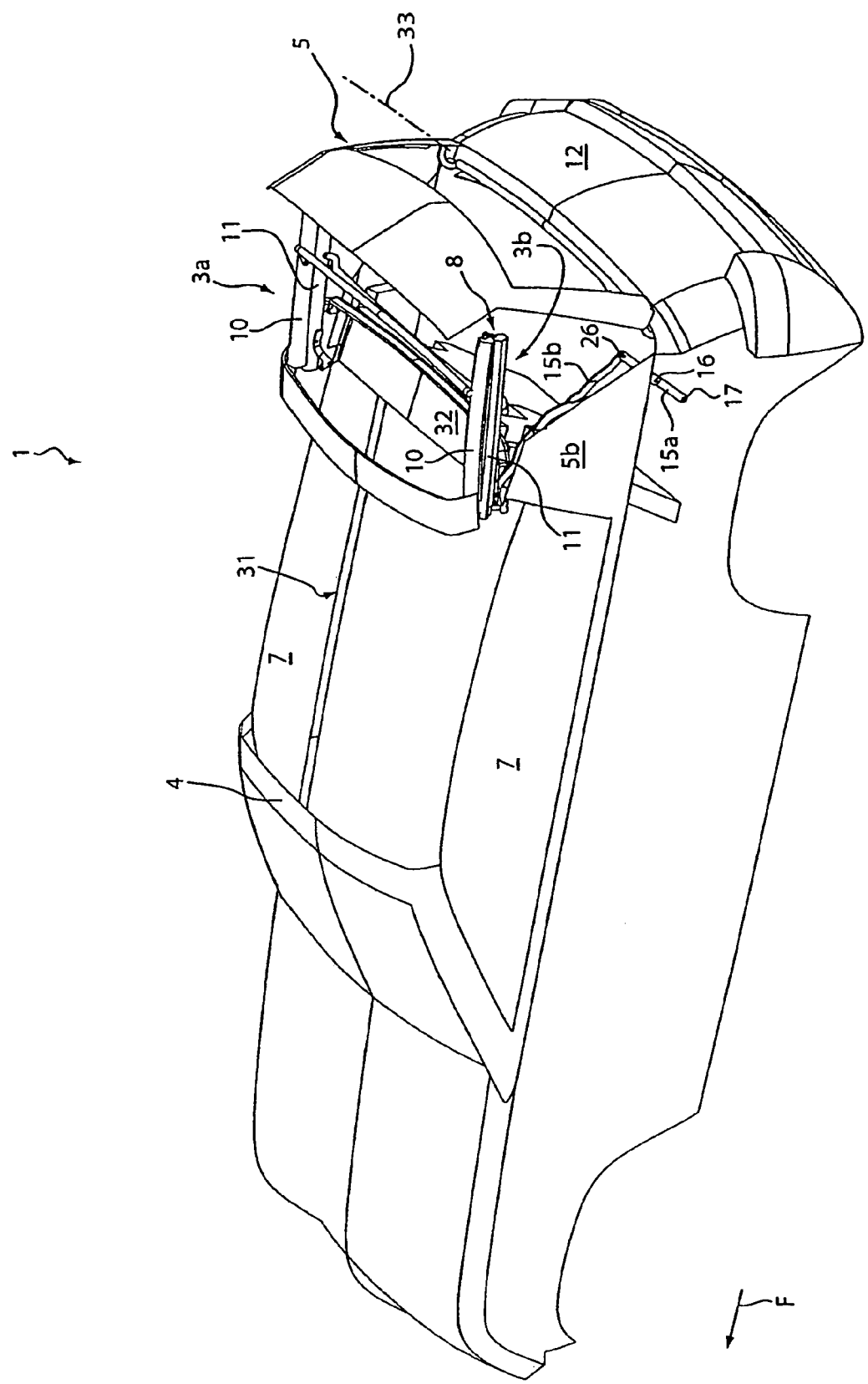
FIG. 5 shows a view similar to that of FIG. 4 in a nearly horizontal and completely folded position of the front roof part.
Figure 6:
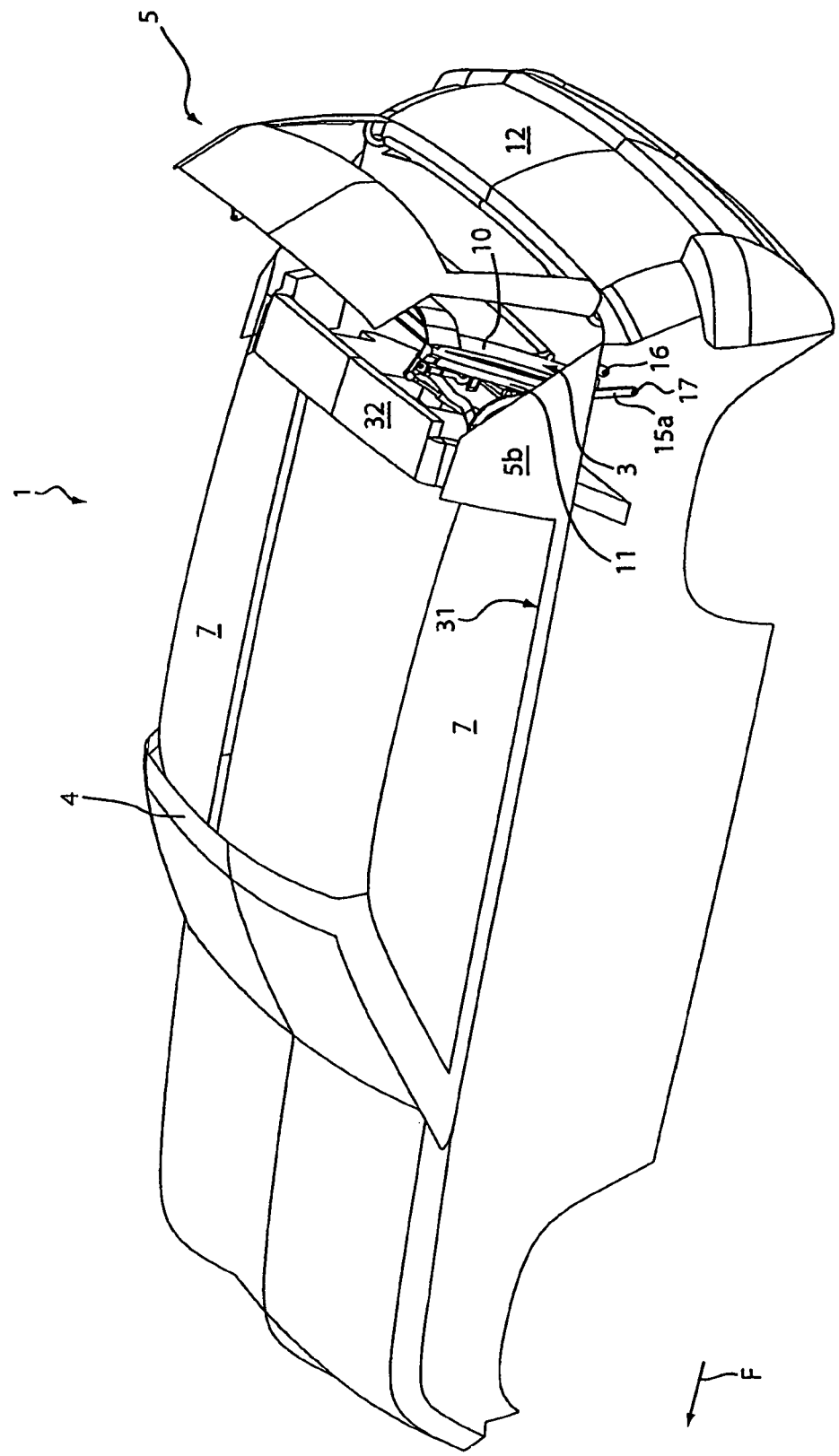
FIG. 6 shows a view similar to that of FIG. 5 in a nearly vertical intermediate position of the front roof part in the automobile body.
Figure 7:
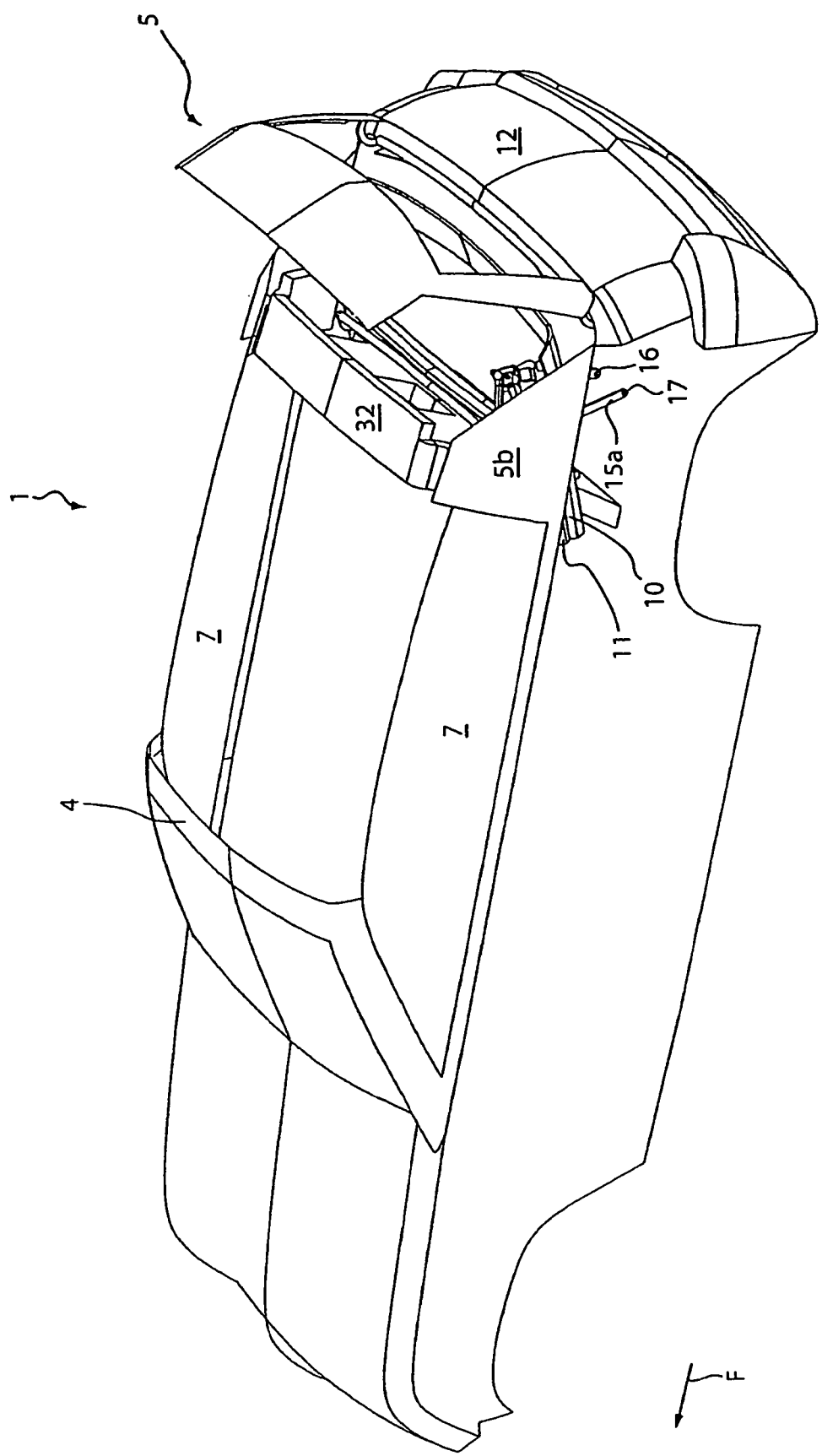
FIG. 7 shows a view similar to that of FIG. 6 with the front roof section swung further in to reach its lowered position in the automobile body.

Here again, in this process, the linkages 14, 15 at first are not yet swiveled about their bearings 16, 17, which are fixed with respect to the automobile body. The bearing 24 still maintains its position, as does the pivot axis 19, until the flip-over position of the roof part 3b as shown in FIG. 5 has been reached.

This position of the movable roof part 3 corresponds to the position shown in FIG. 9, except that now the rear roof part 5 is open to create a passage for the further lowering of the roof part 3 into the automobile body. For this purpose, the links 14a and 14b become oriented more steeply relative to each other, i.e., the angle between them at the joint 24 becomes smaller. At the same time, the section 15a swivels about the axis 17 opposite the direction of arrow 23 out of the position shown in FIGS. 9, 10 and 13, so that the angle between the sections 15a and 15b is decreased, and at the same time the angle between sections 15b and 15c is increased. With the link 14b swiveling about the axis 24, the stack of roof parts 3a and 3b is thus also swiveled into a nearly vertical position (FIG. 14), and, as the movement continues (FIGS. 15 and 16 and FIGS. 6 to 8), the stack of roof parts 3a and 3b then swivels into a position that approaches a horizontal flip-over position of the roof part 3a. In this position, the roof part 3 is then held horizontally or obliquely below the roof part 5, which can then swivel back into its original position about the axis 33 (FIG. 8). Accordingly, a targa-top vehicle is formed according to FIG. 8. In this position, the rear roof part 5 is in the same position as when the roof is completely closed (FIG. 1). In an alternative vehicle or even in the same vehicle, depending on the design, it is also possible for the rear roof part 5 to be (optionally) lowered below the belt line 31 over the stack of the front roof part 3 to form a full convertible.

The aforementioned roof-lowering positions show that various roof-lowering positions can be realized in accordance with the invention. Other positions, which are not shown here, are also possible. Completely different roof kinematics are likewise possible.

A stationary and thus less expensive roll bar 32 can be used on the basis of the lowering kinematics shown here. Moreover, in the illustrated embodiment, the roll bar 32 is covered by the rear roof part 5 in every position of the roof—and thus in every lowered position of the movable roof part 3—and is thus visually inconspicuous and invisible from the outside. The opening for the passage of the movable roof part 3 lies above the roll bar 32 and is thus not restricted by the roll bar.

Moreover, the ability to swivel open the rear roof part 5 ensures that the opening for the passage of the front roof part 3 is also sufficiently large towards the top to allow undisturbed movement of the roof part 3 and yet provide the desired visual covering of the roll bar 32 in the closed position. If the rear roof part 5 cannot be lowered below the belt line 31, then, as mentioned above, the roll bar can be fully concealed from the outside in every final position of the roof 2.

It is advantageous for the roll bar 32 to be designed as a preassembled module that can be mounted as a unit in the automobile body.

The invention claimed is:

1. Motor vehicle (1) with a roof (2) having at least one essentially horizontally extending movable roof part (3) configured to be fully opened and to be fully moved to achieve this full opening, wherein the movable roof part extends from an area adjacent to a windshield frame (4) to a rear roof part (5), wherein the movable roof part (3) is separated from the rear roof part (5), and wherein the movable roof part (3) comprises a front section and a raisable rear section connected to the front section so as to form a continuous structural unit, wherein the rear section is raisable in such a way that the section of the movable roof part (3) located in front of the raisable rear section remains in a closed position and the movable roof part (3) is in a low draft ventilation position that forms an opening between upper edges of side windows of the motor vehicle, and wherein the movable roof part (3) occupies the entire width between the upper edges of the side windows (7) of the motor vehicle (1).

2. Motor vehicle in accordance with claim 1, wherein the movement of the raisable rear section into and out of its raised position is possible while the vehicle is traveling.

3. Motor vehicle in accordance with claim 1, wherein the movable roof part (3) is covered with a flexible covering (9).

4. Motor vehicle in accordance with claim 1, wherein to allow the raisable rear section to be raised, a roof bow (27) is provided which engages under the rear section and is displaceably mounted on lateral frame parts (11) of the movable roof part (3).

5. Motor vehicle in accordance with claim 4, wherein at least one remotely controlled drive is provided for the displacement of the roof bow (27).

6. Motor vehicle in accordance with claim 1, wherein the rear roof part (5) is in the same position with the movable roof part (3) completely open and with the movable roof part (3) completely closed.

7. Motor vehicle in accordance with claim 1, wherein the rear roof part (5) is lowerable below a belt line (31) of the automobile body.

8. Motor vehicle in accordance with claim 1, wherein the rear roof part (5) covers a rigid roll bar (32).

9. Motor vehicle in accordance with claim 1, wherein the rear roof part (5) is at least partially movable to create an opening for the passage of the fully movable roof part (3) to allow the latter to be opened.

10. Motor vehicle in accordance with claim 9, wherein the rear roof part (5) is swingable open about a rear axis (33) to create an opening for the passage of the roof part (3) and is swingable closed again over the opened roof part (3).

11. Motor vehicle in accordance with claim 8, wherein the opening for the passage of the movable roof part (3) is located between the rigid roll bar (32) and the opened rear roof part (5).

* * * * *